No. 826,205. PATENTED JULY 17, 1906.
S. G. WHITEHOUSE.
LENS FOR LAMPS.
APPLICATION FILED NOV. 1, 1904.

WITNESSES
E. O. Allen
J. M. Laing

INVENTOR
SAMUEL GROVES WHITEHOUSE
BY Edward S. Beach
ATTY.

UNITED STATES PATENT OFFICE.

SAMUEL GROVES WHITEHOUSE, OF BIRMINGHAM, ENGLAND.

LENS FOR LAMPS.

No. 826,205.　　　　Specification of Letters Patent.　　　Patented July 17, 1906.

Application filed November 1, 1904. Serial No. 231,025.

*To all whom it may concern:*

Be it known that I, SAMUEL GROVES WHITEHOUSE, cab proprietor, a subject of the King of Great Britain, residing at Phoenix Works, Aston Road, Birmingham, in the county of Warwick, England, have invented certain new and useful Improvements in Lenses for Lamps, of which the following is a specification.

This invention relates to lenses for lamps, and more particularly, though not exclusively, to lenses for lamps for vehicles.

The object of the said invention is to increase the brilliancy of the light of said lamps to a greater degree than has been possible heretofore.

According to the said invention the lens is oval and is constructed in such manner that it has a central oval portion of plano-convex formation which projects outwardly beyond an annular and surrounding oval portion of plano-concave formation, the face or outer wall of the circumferential groove so formed being a continuation of the downwardly-sloping wall of the central projecting portion and the outer margin of the circumferential groove sloping upwardly to the periphery of the lens. The result of this combination of the surfaces of oval form is that the light appears greatly intensified in the central oval portion of the lens by converging rays, while the surrounding oval and concave portion is illuminated in a slightly less degree by outwardly-diverging rays, some of the latter emanating from the marginal part near the periphery of the lens, and so causing the lens to light a wide area.

Figure 2:
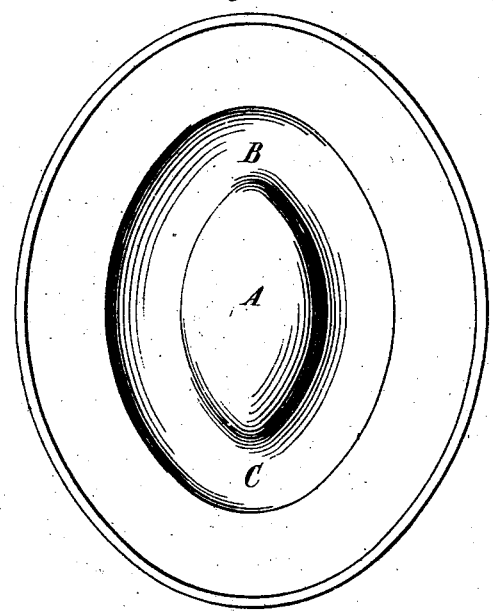
Figure 1:
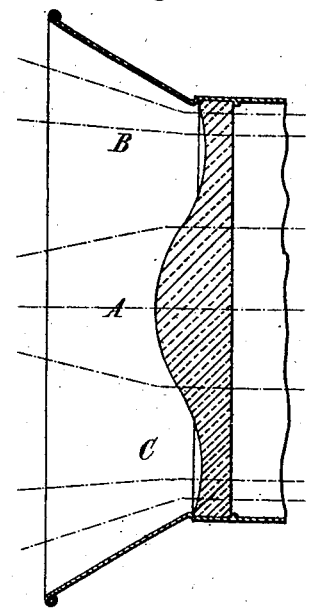

In the accompanying drawings, Figure 1 is a transverse section of the lens portion of the lamp, and Fig. 2 is a front view thereof.

A is the oval projecting plano-convex portion of the lens, and B and C different portions of the plano-concave portion or concentric oval concave groove that extends around the central oval projection and to the periphery of the lens. The dotted lines indicate a pencil of rays emanating from the source of light within the lamp.

What I claim, and desire to secure by Letters Patent of the United States, is—

A lens having a central, oval plano-convex part surrounded by an oval plano-concave portion beyond which the convex part projects, the oval concave portion extending from the central projection to the periphery of the lens.

In testimony whereof I have hereunto set my hand, in presence of two subscribing witnesses, this 11th day of October, 1904.

SAMUEL GROVES WHITEHOUSE.

Witnesses:
　SIDNEY ARTHUR STANLEY,
　REGINALD SMITH.